(12) United States Patent
Kumagai

(10) Patent No.: US 8,819,114 B2
(45) Date of Patent: Aug. 26, 2014

(54) SERVER APPARATUS, METHOD FOR CONTROLLING THE SERVER APPARATUS, AND STORAGE MEDIUM

(75) Inventor: Atsushi Kumagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 605 days.

(21) Appl. No.: 12/473,029

(22) Filed: May 27, 2009

(65) Prior Publication Data

US 2009/0307343 A1 Dec. 10, 2009

(30) Foreign Application Priority Data

Jun. 5, 2008 (JP) ................. 2008-148318
May 14, 2009 (JP) ................. 2009-118046

(51) Int. Cl.
*G06F 15/16* (2006.01)

(52) U.S. Cl.
USPC ........... 709/203; 709/217; 709/219; 705/302; 705/342; 705/346

(58) Field of Classification Search
USPC ......... 709/220, 223, 203, 217, 219; 705/26.1, 705/302, 342, 346
See application file for complete search history.

(56) References Cited

U.S. PATENT DOCUMENTS

| 5,262,940 | A  | * | 11/1993 | Sussman | 705/28 |
|---|---|---|---|---|---|
| 5,521,815 | A  | * | 5/1996 | Rose, Jr. | 705/28 |
| 6,886,748 | B1 | * | 5/2005 | Moore | 235/435 |
| 7,555,464 | B2 | * | 6/2009 | Candelore | 705/59 |
| 8,078,576 | B2 | * | 12/2011 | Power et al. | 707/610 |
| 2001/0034609 | A1 | * | 10/2001 | Dovolis | 705/1 |
| 2002/0059431 | A1 |   | 5/2002 | Terada | |
| 2002/0059570 | A1 | * | 5/2002 | Yoo | 717/170 |
| 2002/0087581 | A1 | * | 7/2002 | Masuda et al. | 707/104.1 |
| 2002/0095299 | A1 | * | 7/2002 | Iwakata | 705/1 |
| 2002/0128851 | A1 | * | 9/2002 | Chefalas et al. | 705/1 |
| 2003/0014267 | A1 | * | 1/2003 | Culp | 705/1 |
| 2003/0126156 | A1 | * | 7/2003 | Stoltenberg et al. | 707/104.1 |
| 2003/0149573 | A1 | * | 8/2003 | Lynton | 705/1 |
| 2004/0002905 | A1 | * | 1/2004 | Oya | 705/28 |
| 2004/0024782 | A1 | * | 2/2004 | Chamberlain | 707/104.1 |
| 2004/0128374 | A1 | * | 7/2004 | Hodges et al. | 709/223 |
| 2005/0033699 | A1 | * | 2/2005 | Umeo et al. | 705/56 |
| 2005/0034054 | A1 | * | 2/2005 | Tsuyama et al. | 715/500 |
| 2006/0004867 | A1 | * | 1/2006 | Tamai et al. | 707/104.1 |
| 2006/0015745 | A1 |   | 1/2006 | Sukigara et al. | |
| 2006/0136566 | A1 | * | 6/2006 | Ohara et al. | 709/217 |

(Continued)

FOREIGN PATENT DOCUMENTS

| JP | 2002-041891 | 2/2002 |
|---|---|---|
| JP | 2006-031175 | 2/2006 |

*Primary Examiner* — Jimmy H Tran

(74) *Attorney, Agent, or Firm* — Cowan, Liebowitz & Latman, P.C.

(57) ABSTRACT

The present invention provides a server apparatus that can communicate with a plurality of client apparatuses via a network, including a receiving unit configured to receive device information relating to a peripheral device capable of being connected to a client apparatus along with an acquisition scheme of the device information from the client apparatus, a storing unit configured to store the device information in association with the acquisition scheme, a judging unit configured to judge whether or not the device information received by the receiving unit has already been stored in the storing unit, and a determining unit configured to determine whether or not the device information is valid based on the acquisition scheme when it is judged by the judging unit that the received device information has already been stored in the storing unit.

7 Claims, 15 Drawing Sheets

(56) References Cited

U.S. PATENT DOCUMENTS

| | | | |
|---|---|---|---|
| 2007/0168200 A1* | 7/2007 | Shimizu | 705/1 |
| 2007/0174196 A1* | 7/2007 | Becker et al. | 705/50 |
| 2007/0208668 A1* | 9/2007 | Candelore | 705/57 |
| 2008/0228657 A1* | 9/2008 | Nabors et al. | 705/80 |
| 2009/0076914 A1* | 3/2009 | Coueignoux | 705/14 |
| 2009/0210698 A1* | 8/2009 | Candelore | 713/153 |
| 2009/0287498 A2* | 11/2009 | Choi | 705/1 |
| 2010/0287059 A1* | 11/2010 | McCoy et al. | 705/26 |

* cited by examiner

FIG. 6

| RECORD ID | CAMERA MODEL NAME | SERIAL NUMBER | USER NAME | REGISTRATION TIME | ACQUISITION SCHEME |
|---|---|---|---|---|---|
| 0000-0000-0001 | PowerShot A520 | 1234567890 | TARO YAMADA | 20070101-123456 | MANUAL |
| 0000-0000-0002 | IXY DIGITAL 1000 | 9876543210 | JIRO TANAKA | 20070101-132433 | AUTO |
| 0000-0000-0003 | PowerShot A520 | 2468246800 | SABURO MIYATA | 20070101-224505 | AUTO |
| ... | ... | ... | ... | ... | ... |
| 1330-2356-3422 | PowerShot A520 | 1234567890 | GORO KAWAMURA | 20070618-184012 | AUTO |
| 611 | 612 | 613 | 614 | 615 | 616 |

| RECORD ID | CAMERA MODEL NAME | SERIAL NUMBER | USER NAME | REGISTRATION TIME | ACQUISITION SCHEME | REGISTRATION DEADLINE |
|---|---|---|---|---|---|---|
| 0000-0000-0001 | PowerShot A520 | 1234567890 | TARO YAMADA | 20070101-123456 | MANUAL | 20071218-184012 |
| 0000-0000-0002 | IXY DIGITAL 1000 | 9876543210 | JIRO TANAKA | 20070101-132433 | AUTO | 00000000-00000000 |
| 0000-0000-0003 | PowerShot A520 | 2468246800 | SABURO MIYATA | 20070101-224505 | AUTO | 00000000-00000000 |
| ... | ... | ... | ... | ... | ... | ... |
| 1330-2356-3422 | PowerShot A520 | 1234567890 | GORO KAWAMURA | 20070618-184012 | AUTO | 20071218-184012 |

1010 / 1011 / 1012 / 1013 / 1014 / 1015 / 1016 / 1017

SERVER APPARATUS, METHOD FOR CONTROLLING THE SERVER APPARATUS, AND STORAGE MEDIUM

BACKGROUND OF THE INVENTION

1. Field of the Invention

The present invention relates to a server apparatus for managing a peripheral device that can be connected to a client apparatus, a method for controlling the server apparatus, and a storage medium.

2. Description of the Related Art

A system including a server, on which the identification information (device information) of a device (for example, a digital camera or a printer) owned by a user is registered, has been available recently. In the system, use of the services and functions provided by the server is limited when the user has not registered a certain device, or the services and functions are provided according to the device registered by the user. When the user wants to register the device information, the device information is manually input into a client apparatus such as a personal computer using a keyboard and the like, and sent to the server apparatus. Alternatively, the device information can be sent to the server apparatus by connecting the device owned by the user to the client apparatus.

However, because a plurality of users can input the same device information in conventional techniques, there is a problem in that multiple registrations of device information occur, and it becomes unclear which user is the correct owner of the device. Such a problem is likely to occur, specifically, in the following two cases.

In the first case, the user wrongly input the device information at the time of inputting the device information using a keyboard and the like. It is also possible that a fraudulent user input the device information of another user on purpose.

In the second case, the user gave or lent the device to another user. If the previous user who owned the device has not deleted the registration of the device information and a user to whom the device was given registers the device information, multiple registration of the device information occurs, and it becomes unclear which user is the current owner.

Multiple registration of the same device information by a plurality of users causes various inconveniences in terms of system operation. For example, services and information unrelated to the actually owned device are provided to the user, causing confusion for the user. Also, for example, when services are provided also to a fraudulent user, operation costs and burdens are generated, and obstructions are also caused in service provision to the authorized user.

SUMMARY OF THE INVENTION

The present invention provides a technique by which a server can store further accurate device information about a device owned by a user.

According to one aspect of the present invention, there is provided a server apparatus that can communicate with a plurality of client apparatuses via a network, including a receiving unit configured to receive device information relating to a peripheral device capable of being connected to a client apparatus along with an acquisition scheme of the device information from the client apparatus, a storing unit configured to store the device information in association with the acquisition scheme, a judging unit configured to judge whether or not the device information received by the receiving unit has already been stored in the storing unit, and a determining unit configured to determine whether or not the device information is valid based on the acquisition scheme when it is judged by the judging unit that the received device information has already been stored in the storing unit, wherein the acquisition scheme indicates if the device information is manually inputted into the client apparatus in response to a user operation, or if the device information is sent from the peripheral device connected to the client apparatus.

Further features of the present invention will become apparent from the following description of exemplary embodiments with reference to the attached drawings.

BRIEF DESCRIPTION OF THE DRAWINGS

FIG. 6 is a diagram illustrating a database for managing the device information of a peripheral device, registered in the server apparatus in the system shown in FIG. 1.

FIG. 10 is a diagram illustrating a database for managing the device information of a peripheral device, registered in the server apparatus in the system shown in FIG. 1.

DESCRIPTION OF THE EMBODIMENTS

Figure 1:
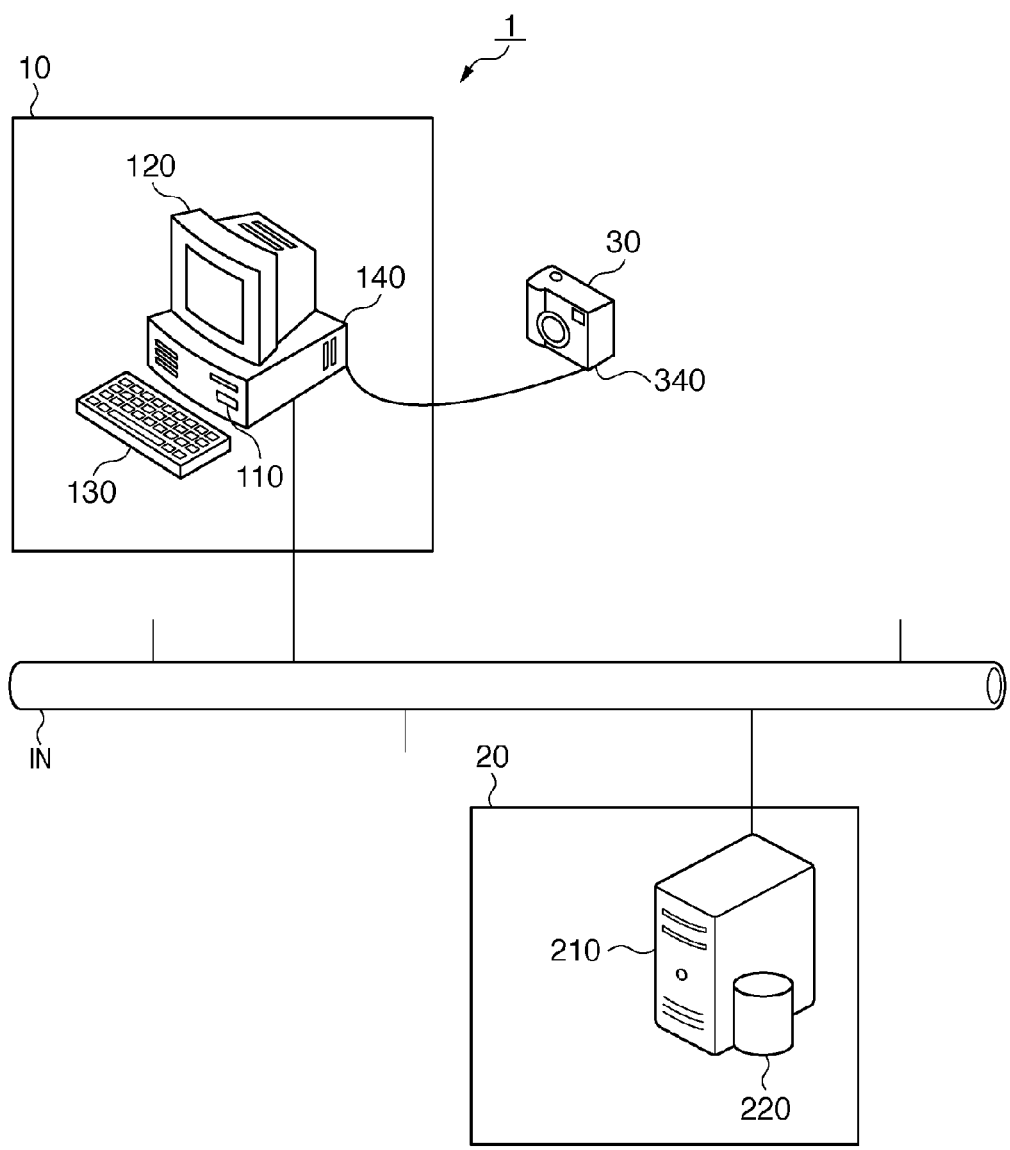
FIG. 1 is a schematic diagram illustrating the configuration of a system as one aspect of the present invention.

Preferred embodiments of the present invention will be described below with reference to the accompanying drawings. Note that the same reference numerals are appended to the same elements in each figure, and redundant descriptions are omitted.

First Embodiment

FIG. 1 is a schematic diagram illustrating a configuration of a system 1 as one aspect of the present invention. The system 1 includes a client apparatus (information processing apparatus) 10 and a server apparatus (information processing apparatus) 20 that are connected to the Internet IN.

The client apparatus 10 is configured of a general personal computer (PC), and a user makes a connection to the server apparatus 20 using a web browser and uses the online service provided by the server apparatus 20. The client apparatus 10 includes, in this embodiment, a processing unit 110, a display unit 120, and a keyboard 130. The client apparatus 10 also includes a connection port for making a connection to a peripheral device, and in this embodiment, includes a USB port 140 for making a connection to a USB port 340 included in a camera 30 as the peripheral device. Although the camera 30 is used as an example of the peripheral device in the following description, other peripheral devices that can be connected to the client apparatus 10, for example, a printer, can also be used for the embodiment. An OS (Operating System) and a Web browser program are installed in the client apparatus 10.

The server apparatus 20 is configured of a general personal computer (PC), and provides online services to a plurality of clients (in this embodiment, the client apparatus 10) that are connected via the Internet IN. The server apparatus 20 includes, in this embodiment, a processing unit 210, and an external storage device 220 that stores a database. Note that the server apparatus 20 may further include a display unit, a keyboard, a connection port that is capable of making a connection to the server apparatus 20 for a peripheral device, and the like as does the client apparatus 10. A Web application program, an OS for the server, and the like are installed in the server apparatus 20.

Figure 2:
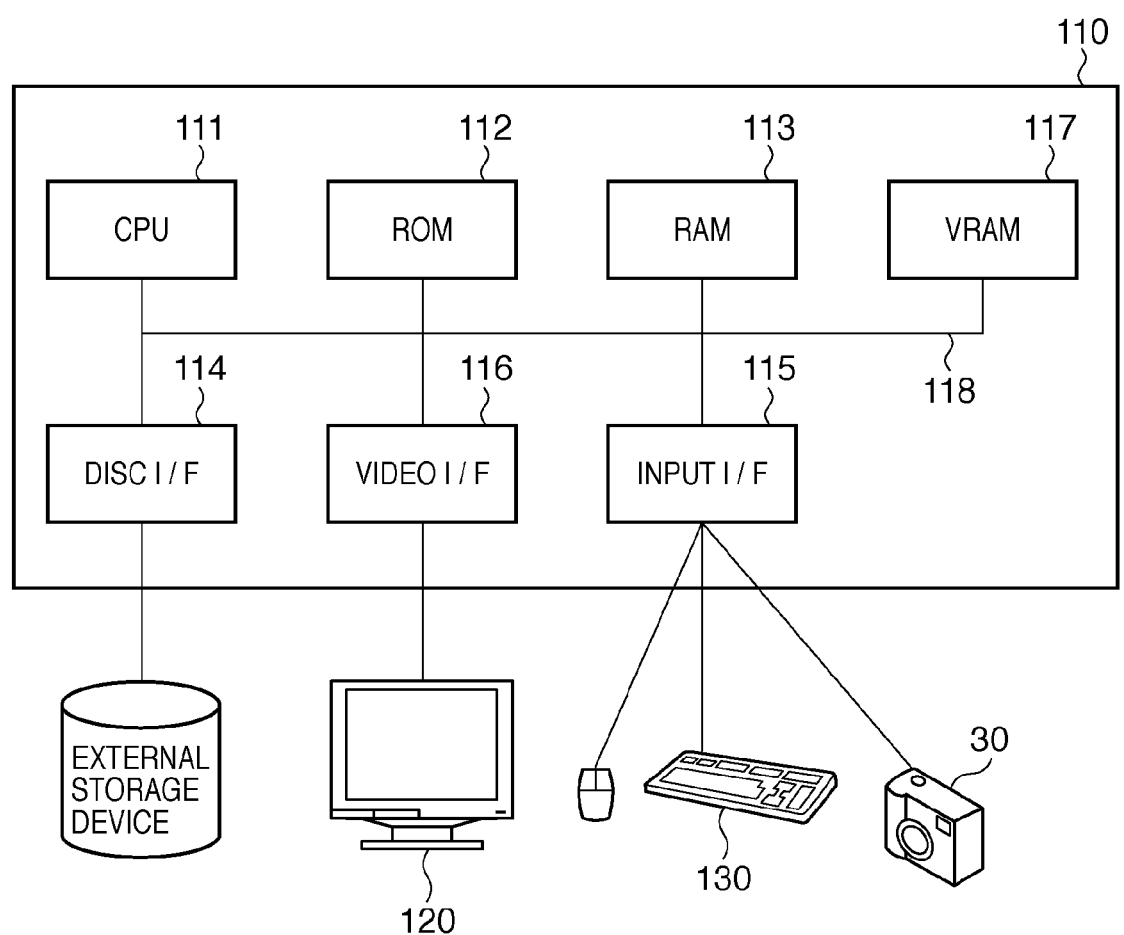
FIG. 2 is a schematic diagram illustrating the configuration of a processing unit of a client apparatus in the system shown in FIG. 1.

FIG. 2 is a schematic diagram illustrating a configuration of the processing unit 110 of the client apparatus 10. The processing unit 110 of the client apparatus 10 and the processing unit 210 of the server apparatus 20 have the same configuration, therefore, descriptions are given using the processing unit 110 of the client apparatus 10 as an example in this embodiment.

A central processing device 111, for example, a CPU (Central Processing Unit) takes overall control of the processing unit 110.

A ROM (Read Only Memory) 112 stores programs and parameters that do not need changes.

A RAM (Random Access Memory) 113 temporarily stores programs and data that are supplied from the external storage device and the like.

A disc interface (I/F) 114 is an interface for making a connection to a hard disk that is fixed in the client apparatus 10, and to an external storage device including an optical disc, a magnetic disc, an IC card, a memory card, and the like that is removable from the client apparatus 10. In the external storage device, an OS (Operating System), and various programs are stored.

An input interface (I/F) 115 is an interface for making a connection to a pointing device that accepts operation from the user and inputs data and instructions, and to an input device such as a keyboard 130.

A video interface (I/F) 116 is an interface for making a connection to the display unit 120 that displays data, and the pages and messages of an online service to be mentioned later.

A VRAM (Video RAM) 117 stores image data displayed on the display unit 120.

A system bus 118 communicably connects the CPU 111, the ROM 112, the RAM 113, the disc I/F 114, the input I/F 115, video I/F 116, and VRAM 117.

The processing unit 110 also includes, other than the disc I/F 114, the input I/F 115, and video I/F 116, a network interface for making a connection to a network such as the Internet IN.

Figure 3:
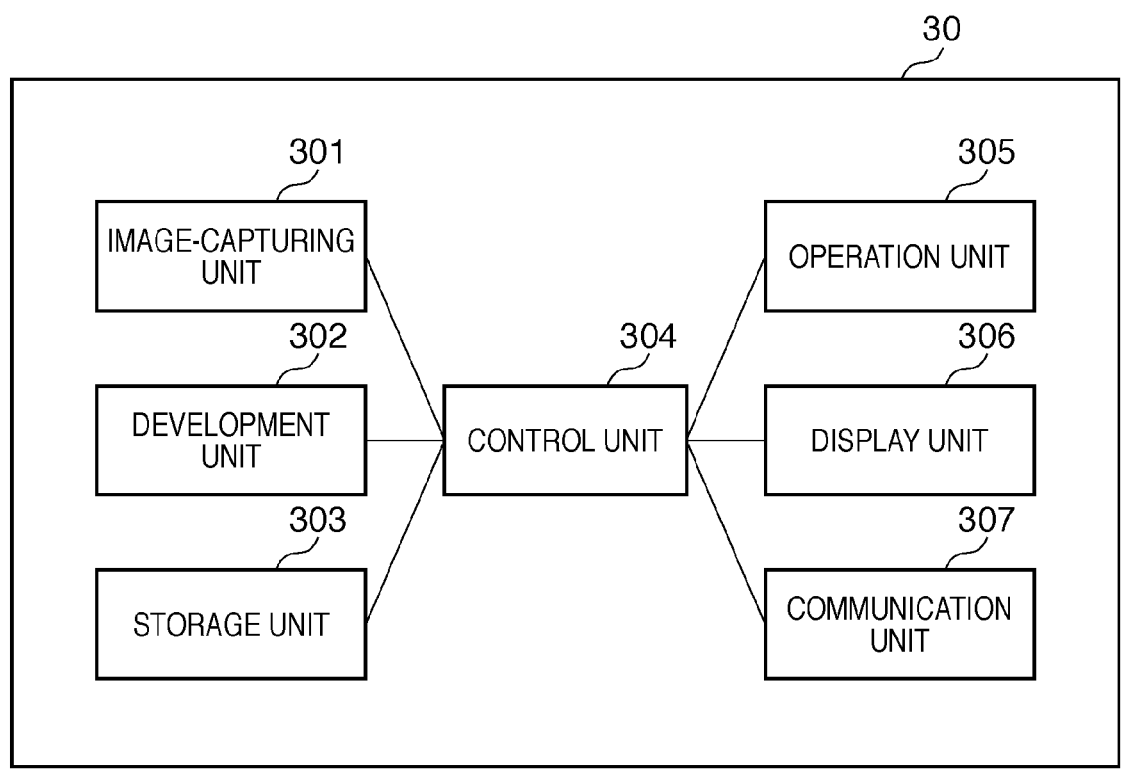
FIG. 3 is a schematic diagram illustrating the configuration of a camera as a peripheral device capable of being connected to a client apparatus of the system shown in FIG. 1.

FIG. 3 is a schematic diagram illustrating a configuration of the camera 30. The camera 30 is realized as a digital camera that captures images of a photographic subject in this embodiment. The camera 30 includes, as shown in FIG. 3, an image-capturing unit 301, a development unit 302, a storage unit 303, a control unit 304, an operation unit 305, a display unit 306, and a communication unit 307.

The control unit 304 controls and causes the image-capturing unit 301, the development unit 302, the storage unit 303, the operation unit 305, the display unit 306, and the communication unit 307 to execute the operations described in the following.

The image-capturing unit 301 captures images of a photographic subject and creates image signals, and stores the image signals in the storage unit 303.

The development unit 302 performs development processing, compression processing, expansion processing, and the like on the image signals, and creates image data.

The storage unit 303 stores image data and information used in displaying and development processing of the image data.

The operation unit 305 includes devices such as a button, a dial, and a digitizer, and the information inputted by operating such devices is transmitted to the control unit 304.

The display unit 306 displays previews of the images corresponding to the image data, and a menu screen for inputting instructions relating to image-capturing and playback.

The communication unit 307 sends various data and information to the client apparatus 10, and receives various data and information from the client apparatus 10.

In the following, processing relating to online services provided by the server apparatus 20 in the system 1 is described.

Figure 4:
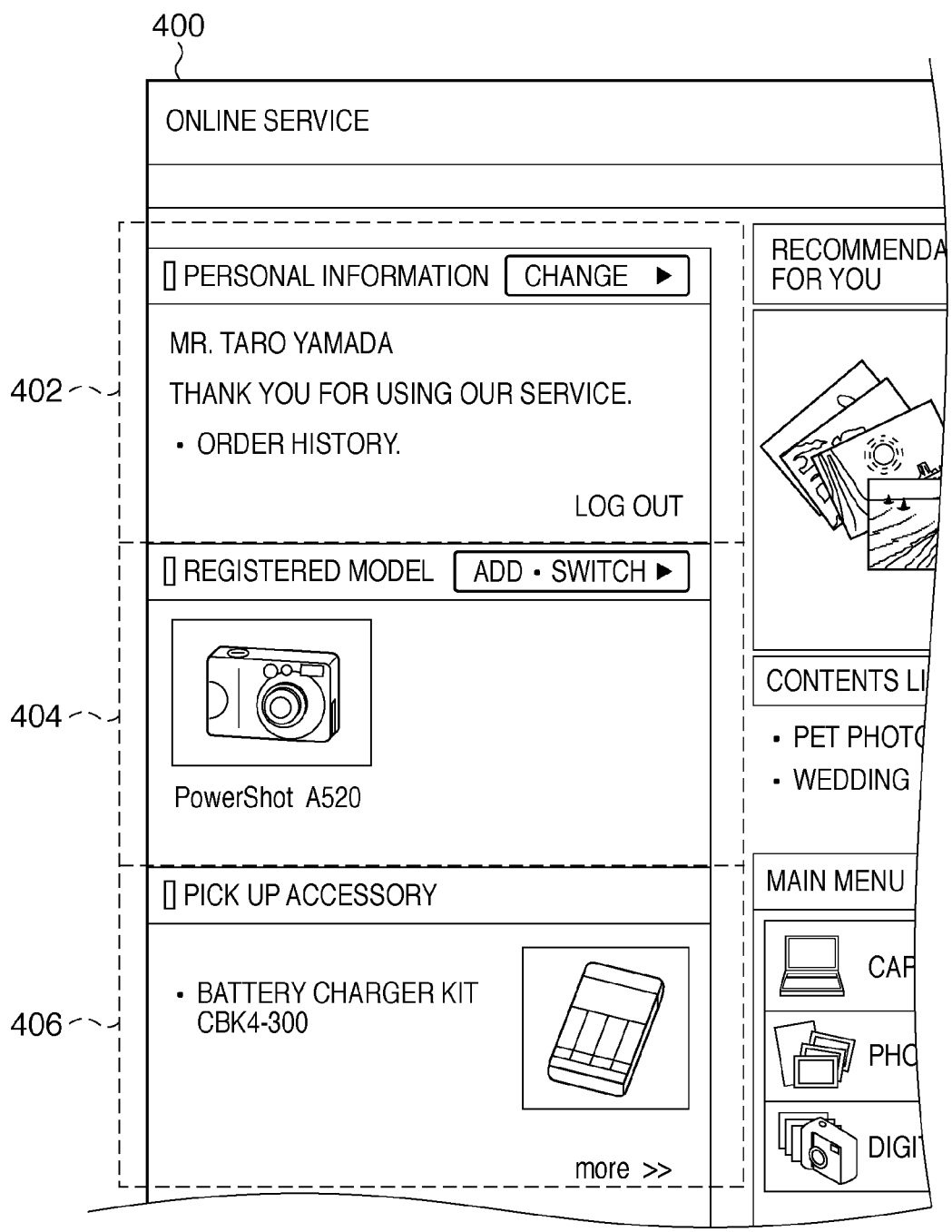
FIG. 4 is a diagram illustrating a portion of a main page of an online service provided by a server apparatus in the system shown in FIG. 1.

FIG. 4 is a diagram illustrating a portion of a main page 400 of an online service provided by the server apparatus 20. The main page 400 is displayed on the display unit 120 of the client apparatus 10 when the client apparatus 10 logs into the online service. The client apparatus 10 has been connected in advance to a membership registration page of the online service the server apparatus 20 provides, and user information such as a user name and a password unique to the user has been sent to the server apparatus 20. Then, the server apparatus 20 stores the user information. Afterwards, the client apparatus 10 makes a connection to the log-in page of the online service, and requests log-in by sending the user name and the password to the server apparatus 20. The server apparatus 20 accepts the log-in request, and when the user information stored in advance and the user name and the password that were sent at this time match, the main page 400 is provided to the client apparatus 10 as the log-in authentication of the client apparatus 10 has succeeded.

The main page 400 includes a user information display region 402 that displays user information, a device information display region 404 that displays device information unique to the peripheral device registered in association with the user information, and an advertisement display region 406. Furthermore, the device information (for example, model name, serial number, and the like) of the peripheral device owned by the user stored in the server apparatus 20 is displayed on the device information display region 404 of the main page 400. Advertisements that are compatible with the device information, for example, advertisements of optional parts that match the peripheral device of the device information are displayed in the advertisement display region 406.

Figure 5:
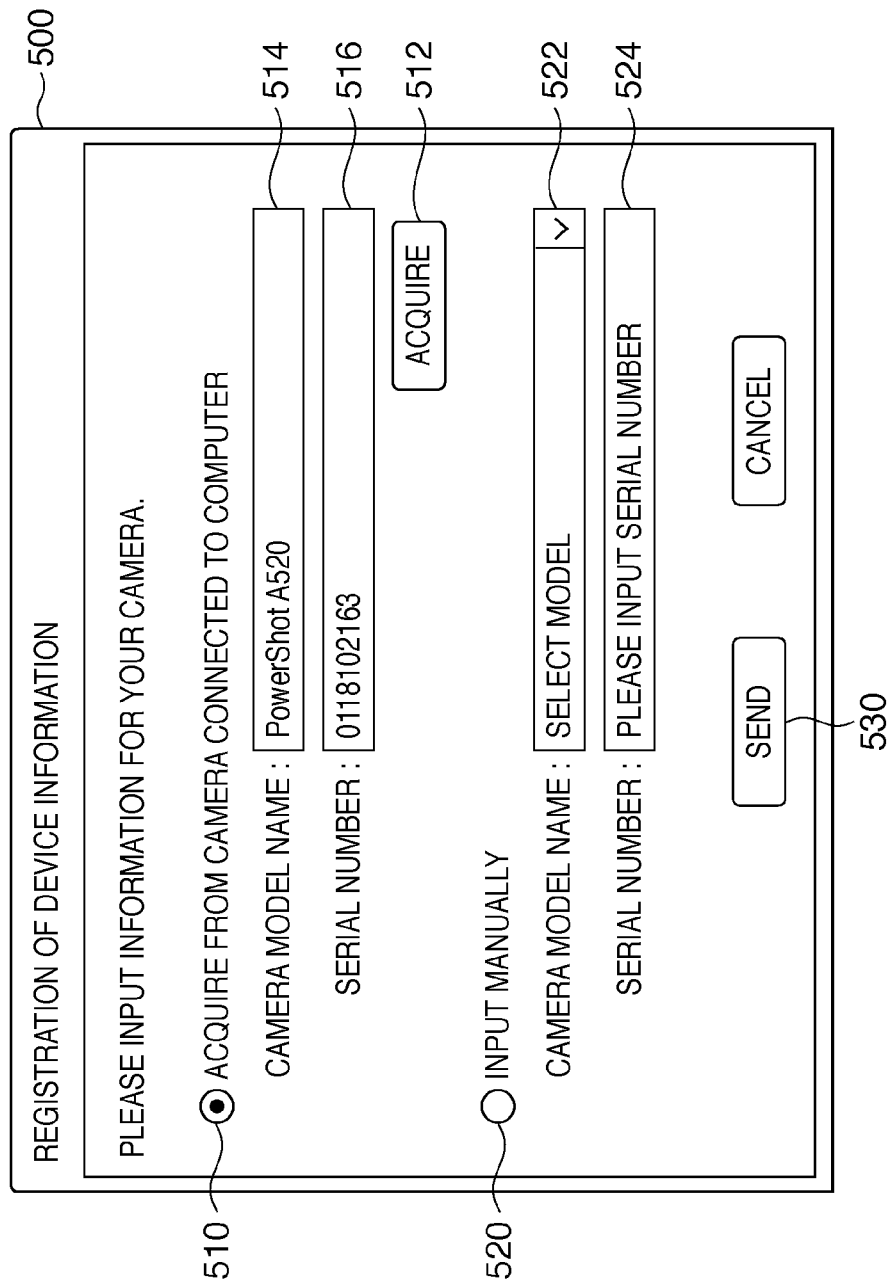
FIG. 5 is a diagram illustrating a device information registration page of an online service provided by the server apparatus in the system shown in FIG. 1.

Then, when an add-in button for registering models in the main page 400 displayed on the display unit 120 of the client apparatus 10 is clicked by user operation, the client apparatus 10 sends a request for registration of the device information to the server apparatus 20. The server apparatus 20 provides a registration page 500 of the online service for the device information to the client apparatus 10, and causes the registration page 500 to be displayed on the display unit 120 in response to the registration request. FIG. 5 is a diagram illustrating the registration page 500. The registration page 500 includes radio buttons 510 and 520 for selecting if the device information is to be automatically inputted from the peripheral device connected to the client apparatus 10, or values manually input by the user are to be acquired as the device information, and a send button 530.

The radio button 510 is a button for designating, for example, that the client apparatus 10 is to receive the device information from the main body of the camera 30 that is connected thereto. The user selects the radio button 510, and clicks an acquisition button 512 that instructs that the device information be acquired while the USB port 340 of the camera 30 and the USB port 140 of the client apparatus 10 are in a connected state. Thus, the device information stored in the main body of the camera 30 is sent from the camera 30 to the client apparatus 10, and automatically input. Then, the device information is displayed on the registration page 500. In FIG. 5, the camera model name is displayed in a camera model name input region 514, and the serial number is displayed in a serial number input region 516. Furthermore, AUTO is set as acquisition scheme information.

The radio button 520 is a button for designating, for example, that the user will manually input the device information through the keyboard 130. The user manually inputs the camera model name in the camera model name input region 522 and the serial number in the serial number input region 524 through the keyboard 130 while the radio button 520 is selected. Then, the device information is displayed on the registration page 500. Furthermore, MANUAL is set as the acquisition scheme information.

The send button 530 is a button for the user to instruct the client apparatus 10 to send the camera model name displayed on the camera model name input region 514 or 522 and the serial number displayed on the serial number input region 516 or 524 to the server apparatus 20. The user clicks the send button 530 while the camera model name is being displayed in the camera model name input region 514 or 522 and the serial number is being displayed in the serial number input region 516 or 524. The client apparatus 10 in response sends necessary information such as the acquisition scheme information along with the device information to the server apparatus 20. The server apparatus 20 receives such information, and stores the camera model name displayed in the camera model name input region 514 or 522 and the serial number displayed in the serial number input region 516 or 524 as the device information of the camera 30 in association with the user information of the logged in user.

The server apparatus 20 overwrites the device information when the same device information has already been stored in association with the user information of the logged in user. At that time, a selection can be made according to predetermined conditions as to whether the overwriting is to be performed with the new acquisition scheme information, or the existing acquisition scheme information is to be kept. For example, when the acquisition scheme information of the new device information is AUTO, which is to be mentioned later, overwriting is performed with the new acquisition scheme information. Or, for example, when the acquisition scheme information of the new device information is MANUAL, which is to be mentioned later, and the acquisition scheme information of the existing device information is AUTO, the existing acquisition scheme information is kept without performing overwriting.

The server apparatus 20 performs overwriting with the camera model name of the new device information, as long as the acquisition scheme information of the new device information is AUTO, which is to be mentioned later, when the device information for the same serial number has already been stored in association with the user information of the logged in user but the camera model name is different. In contrast, when the acquisition scheme information of the new device information is MANUAL, which is to be mentioned later, the existing camera model name is kept without performing overwriting, and the new camera model name is not stored.

FIG. 6 is a diagram illustrating a database 600 for managing the device information of a peripheral device, stored in the server apparatus 20. The database 600 is stored in the external storage device 220, and includes a record 610 for the device information of a peripheral device. The device information is stored in association with the user information along with the registration history including at least the acquisition scheme information indicating if the device information is manually inputted by the user into the client apparatus 10 or automatically inputted from the peripheral device connected to the client apparatus 10, and registration time information.

The record 610 is configured of, in this embodiment, a record ID 611, a camera model name 612, a serial number 613, a user name 614, a registration time 615, and an acquisition scheme 616.

The record ID 611 is an identification character string that is unique to the record, and automatically created when the server apparatus 20 newly creates the record 610 (that is, when storing a new user or new device information).

In the cells of the camera model name 612 and the serial number 613, the device information that is inputted into the registration page 500 shown in FIG. 5 and sent from the client apparatus 10 to the server apparatus 20 is recorded.

In the cells of the user name 614, the name of the user who requested the registration of the device information is recorded. The name of the user who requested the registration of the device information is sent along with the device information from the client apparatus 10 to the server apparatus 20.

In the cells of the registration time 615, the time when the server apparatus 20 stored the device information, or the last update time of the record 610 is automatically recorded by the server apparatus 20.

In the cells of the acquisition scheme 616, the acquisition scheme information that indicates whether the device information is manually input by the user into the client apparatus 10 or automatically input from the peripheral device connected into the client apparatus 10 is recorded.

Figure 7:
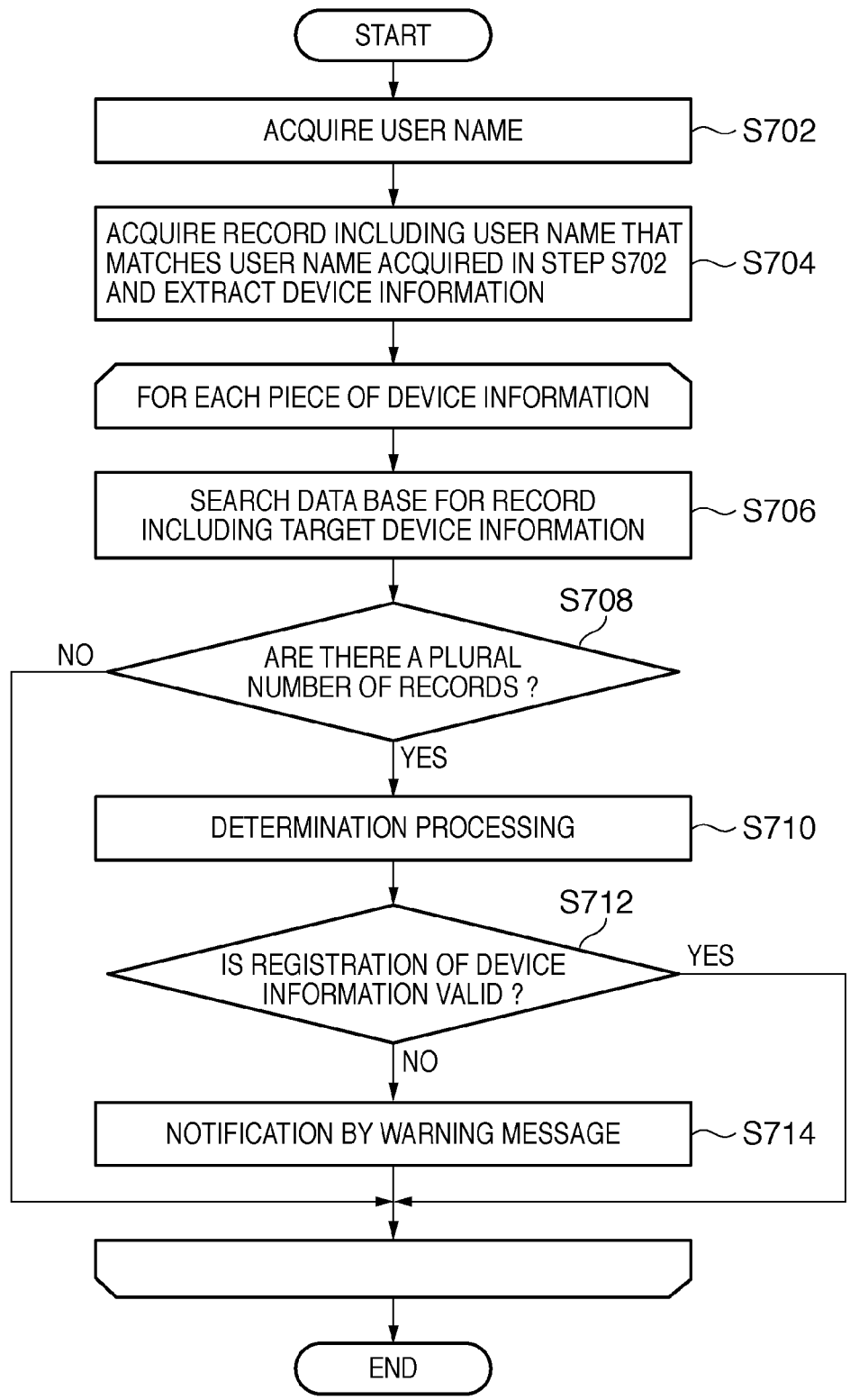
FIG. 7 is a flow chart illustrating the processing executed in the server apparatus when a user makes a connection to an online service via the client apparatus in the system shown in FIG. 1.

With reference to FIG. 7, descriptions are given of the processing executed by the server apparatus 20 before providing the main page 400 with the successful log-in authentication of the client apparatus 10 in the system 1.

First, in step S702, the user name of a user (in the following, referred to as a logged in user) of the client apparatus 10 that successfully authenticated log-in is acquired. The server apparatus 20 stores the user information sent from the client apparatus 10 at the time of performing log-in authentication in a temporary memory.

Next, in step S704, all of the records 610 including the user name 614 that matches the user name acquired in step S702 are acquired from the database 600, and the device information is extracted from the record 610.

Then, processing from step S706 is repeated for each piece of device information extracted in step S704.

In step S706, the database 600 is searched for the record 610 including the target device information.

In step S708, it is judged whether or not the record 610 including the target device information found in step S706 exists in a plural number. In other words, in step S708, it is judged whether or not multiple registration of the device information has occurred.

When there is no multiple registration of the device information, the record 610 found in step S706 does not exist in a plural number (that is, the record 610 is a single record), therefore, the registration of the device information by the logged in user is determined as valid. Then, setting the next piece of device information as the target, the processing from step S706 is repeated.

When multiple registration of device information occurs, the record 610 found in step S706 exists in a plural number, therefore, in step S710, determination processing in which a determination is made as to whether the registration of the device information by the logged in user is valid or invalid is executed. The determination processing is executed by passing the plurality of records 610 searched for in step S706, and the user name acquired in step S702 to a determination module operating in the server apparatus 20. The determination processing in which a determination is made as to whether the registration of the device information by the logged in user is valid or invalid is described in detail later on.

In step S712, a determination is made as to whether the registration of the device information by the logged in user is valid based on the result of the determination processing in step S710.

When the registration of the device information by the logged in user is valid, setting the next piece of device information as the target, the processing from step S706 is repeated.

When the registration of the device information by the logged in user is not valid (when it is invalid), in step S714, the client apparatus 10 is notified with a warning message (FIG. 8) indicating that the registration of the device information is invalid. Then, setting the next piece of device information as the target, the processing from step S706 is repeated. When it is determined that the registration of the device information is invalid, unless the device information registered in the server apparatus 20 is updated, the warning message is displayed every time the same user logs into the server apparatus 20 and tries to use the online service.

Figure 8:
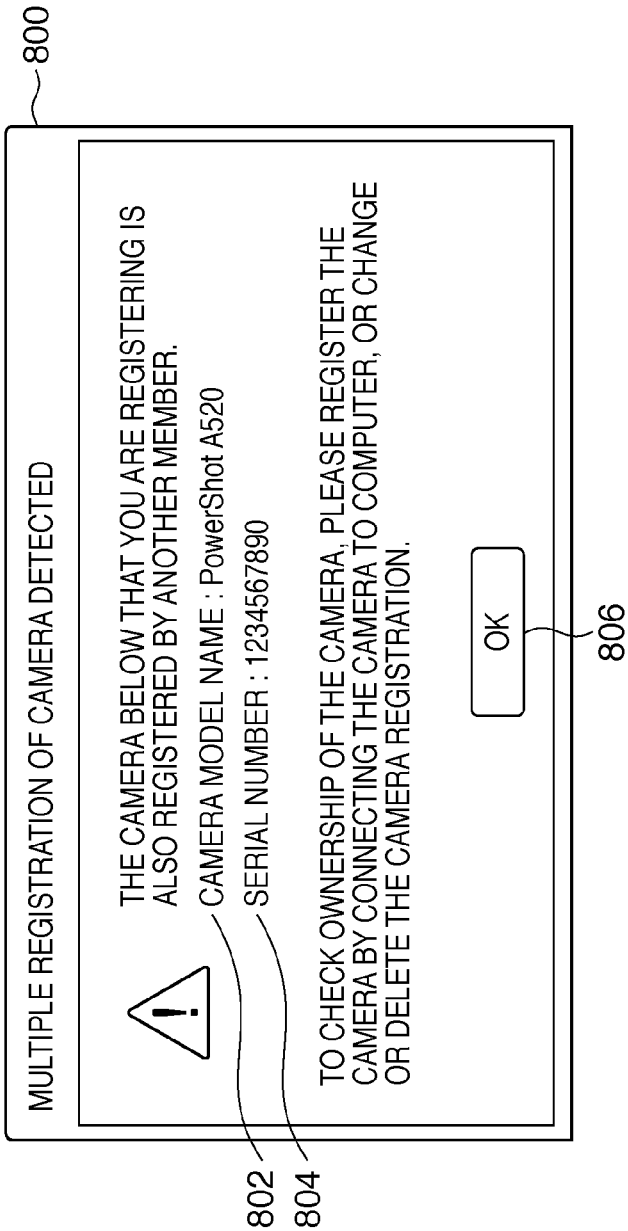
FIG. 8 is a diagram illustrating a warning message the client apparatus is notified with in step S714 shown in FIG. 7.

FIG. 8 is a diagram illustrating a warning message 800 the client apparatus 10 is notified with in step S714. The warning message 800 is displayed on the display unit 120 of the client apparatus 10. The warning message 800 displays a camera model name 802 and a serial number 804 for the user to see which piece of device information registration is determined to be invalid. The warning message 800 also includes an OK button 806 for closing the warning message 800.

By causing the server apparatus 20 to execute the processing shown in FIG. 7, notification with the warning message is performed only when a determination is made that the device information that was registered by the logged in user was invalid.

Figure 9:
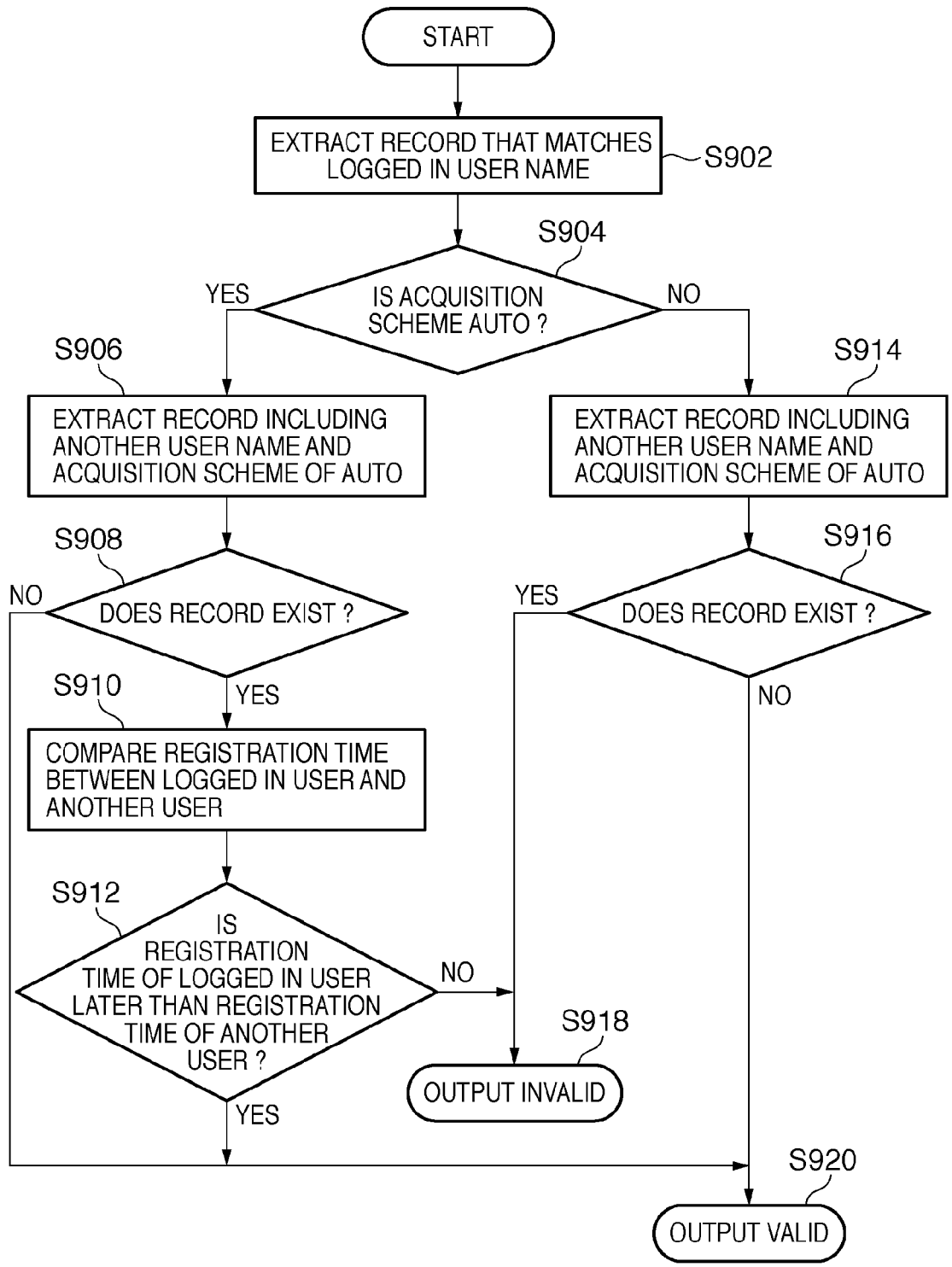
FIG. 9 is a flow chart illustrating the determination processing in step S710 shown in FIG. 7.

With reference to FIG. 9, descriptions are given of the determination processing in step S710. The determination processing in step S710 is executed by passing, as described above, a plurality of records 610 searched for in step S706, and the user name acquired in step S702 to the determination module. In the following, another user who has registered the same device information as that of the logged in user in the online service of the server apparatus 20 is referred to as "another user (another user name)".

First, in step S902, the record that matches the user name of the logged in user acquired in step S702 is extracted from the plurality of records 610 searched for in step S706. Note that among the plurality of records 610 searched for in step S706, only one record including the user name 614 that matches the user name of the logged in user exists.

Next, in step S904, it is judged whether or not the acquisition scheme 616 of the record of the logged in user name extracted in step S902 is AUTO.

When it is judged that the acquisition scheme 616 of the record of the logged in user name is AUTO, the processing moves to step S906. In step S906, among the plurality of records 610 searched for in step S706, a record that includes the user name 614 that does not match the logged in user name and the acquisition scheme 616 of AUTO is extracted. In other words, a record including the user name 614 of another user name and the acquisition scheme 616 of AUTO is extracted.

In step S908, it is determined whether or not a record is extracted in step S906.

When there is no record extracted in step S906, in step S920, the fact that the registration of the device information by the logged in user is valid as a result of determination processing is output, and the determination processing ends.

When there is a record extracted in step S906, in step S910, a comparison is made between the registration time 615 of all the records extracted in step S906 and the registration time 615 of the record of the logged in user.

In step S912, from the result of the comparison in step S910, it is determined whether or not the registration time 615 of the record of the logged in user is later than the registration time 615 of the record of another user.

When the registration time 615 of the record of the logged in user is later than the registration time 615 of the record of another user, in step S920, the fact that the registration of the device information by the logged in user is valid is output, and the determination processing ends.

When the registration time 615 of the record of the logged in user is earlier than the registration time 615 of the record of another user, the processing moves to step S918. In other words, when the registration time 615 of the record of another user is later than the registration time 615 of the record of the logged in user, the processing moves to step S918. In step S918, the fact that the registration of the device information by the logged in user is invalid as a result of determination processing is outputted, and the determination processing ends.

On the other hand, when it is judged that the acquisition scheme 616 of the record of the logged in user name is not AUTO (that is, it is MANUAL), the processing moves to step S914. In step S914, a record including a user name 614 that does not match the logged in user name and the acquisition scheme 616 of AUTO is extracted from the plurality of records 610 searched for in step S706. In other words, a record including a user name 614 of another user name and the acquisition scheme 616 of AUTO is extracted.

In step S916, it is determined whether or not a record is extracted in step S914.

When there is no record extracted in step S914, in step S920, the fact that the registration of the device information by the logged in user is valid as a result of determination processing is output, and the determination processing ends.

When there is a record extracted in step S914, in step S918, the fact that the registration of the device information by the logged in user is invalid as a result of determination processing is outputted, and the determination processing ends.

In the determination processing shown in step S916 of FIG. 9, when there is no record including a user name 614 of another user name and the acquisition scheme 616 of AUTO, that is, when the acquisition schemes of the multiple-registered device information are all MANUAL, all the registrations of the device information are considered valid. However, it is also possible to consider all the registrations of the device information invalid when the acquisition schemes of the multiple-registered device information are all MANUAL, as described later.

As described above, in the first embodiment, by determining the registration of device information acquired automatically from a peripheral device that is connected to the client apparatus 10 to be valid with such a priority, the possibility of determining the registration by the user who actually owns the peripheral device as valid can be increased. Furthermore, the possibility for registering more accurate device information can be increased.

Furthermore, because the warning message as shown in FIG. 8 is displayed to a user whose registration of device information is determined as invalid, the psychological effects of suppressing registration of invalid device information, prompting alteration of the wrong device information, can be imparted.

The device information of the peripheral device can also be acquired by a reading apparatus that reads bar code information and the like that are written on a body that is separate from the peripheral device, instead of the user manually inputting the device information from a keyboard 130. The reading apparatus is connected to the client apparatus 10, and acquires the device information of the camera 30 by reading information written on a box storing the camera 30 or in the specification that is enclosed with the camera 30. The bar code information may be written on the box storing the camera 30 or in the specification enclosed with the camera 30. The camera model name and the serial number of the camera 30 are embedded in the bar code, and by reading the bar code with the reading apparatus, the camera model name and the serial number of the camera 30 are input to the client apparatus 10. However, the information containing the device information of the camera 30 is not limited to a bar code and, for example, may be letters. In this case, image processing is performed on the image of the letters read with the reading apparatus and, by converting them into text data, the device information of the camera 30 is acquired. Thus, the possibility of wrongly inputting the information is reduced compared with the case where the information is manually input by a user. However, it is highly possible that the box storing the camera 30 and the specification enclosed with the camera 30 are in a place separate from the camera 30, and possession of the box and the specification does not completely correspond to actual ownership of the camera 30. Therefore, in this embodiment, the validity of the registered device information is considered to also be lower when the device information is acquired with the reading apparatus, as in the case where the user manually input the device information, than the case where the device information is acquired by connecting the camera 30.

Furthermore, in this embodiment, descriptions are given of the case where the client apparatus 10 sets the acquisition scheme information in response to user operation and sends the information to the server apparatus 20, and the server apparatus 20 recognizes if the acquisition scheme of the device information is AUTO or MANUAL based on the information. However, the recognizing method of the acquisition scheme is not limited thereto. For example, there may be a case, due to changes in the registration procedure by the service provider, where the registrations of device information executed after a certain time and date will all be AUTO, but the registrations of the device information executed before that time and date will all be MANUAL. In such a case, the record of the database 600 of the server apparatus 20 can be recognized as AUTO as long as the registration time 615 stored is after that certain time and date, and considered as MANUAL before that time and date.

Second Embodiment

In the first embodiment, descriptions are given of the processing in which the notification of the warning message shown in FIG. 8 is given when the registration of multiple-registered device information is determined to be invalid. In the second embodiment, descriptions are given of processing in which the record of the device information is deleted when the registration of the multiple-registered device information is determined to be invalid.

FIG. 10 is a diagram illustrating a database 1000 for managing the device information of a peripheral device, registered in the server apparatus 20. The database 1000 is stored in an external storage device 220, and includes a record 1010 for the device information of the peripheral device.

In this embodiment, the record 1010 is configured of a record ID 1011, a camera model name 1012, a serial number 1013, a user name 1014, a registration time 1015, an acquisition scheme 1016, and a registration deadline 1017.

The record ID 1011, the camera model name 1012, and the serial number 1013 are the same as the record ID 611, the camera model name 612, and the serial number 613 of the database 600 shown in FIG. 6. Similarly, a user name 1014, a registration time 1015, and an acquisition scheme 1016 are the same as the user name 614, the registration time 615, and the acquisition scheme 616 of the database 600 shown in FIG. 6.

In the cells of the registration deadline 1017, the device information of registration deadline is recorded. For the registration deadline 1017, generally, "00000000-000000" indicating no deadline is recorded. On the other hand, when multiple registration of device information is detected and the registration of the device information is determined to be invalid, in the cells of the registration deadline 1017, a deletion period (or a time when the device information is to be deleted) for deleting the device information determined to be invalid is recorded.

Figure 11:
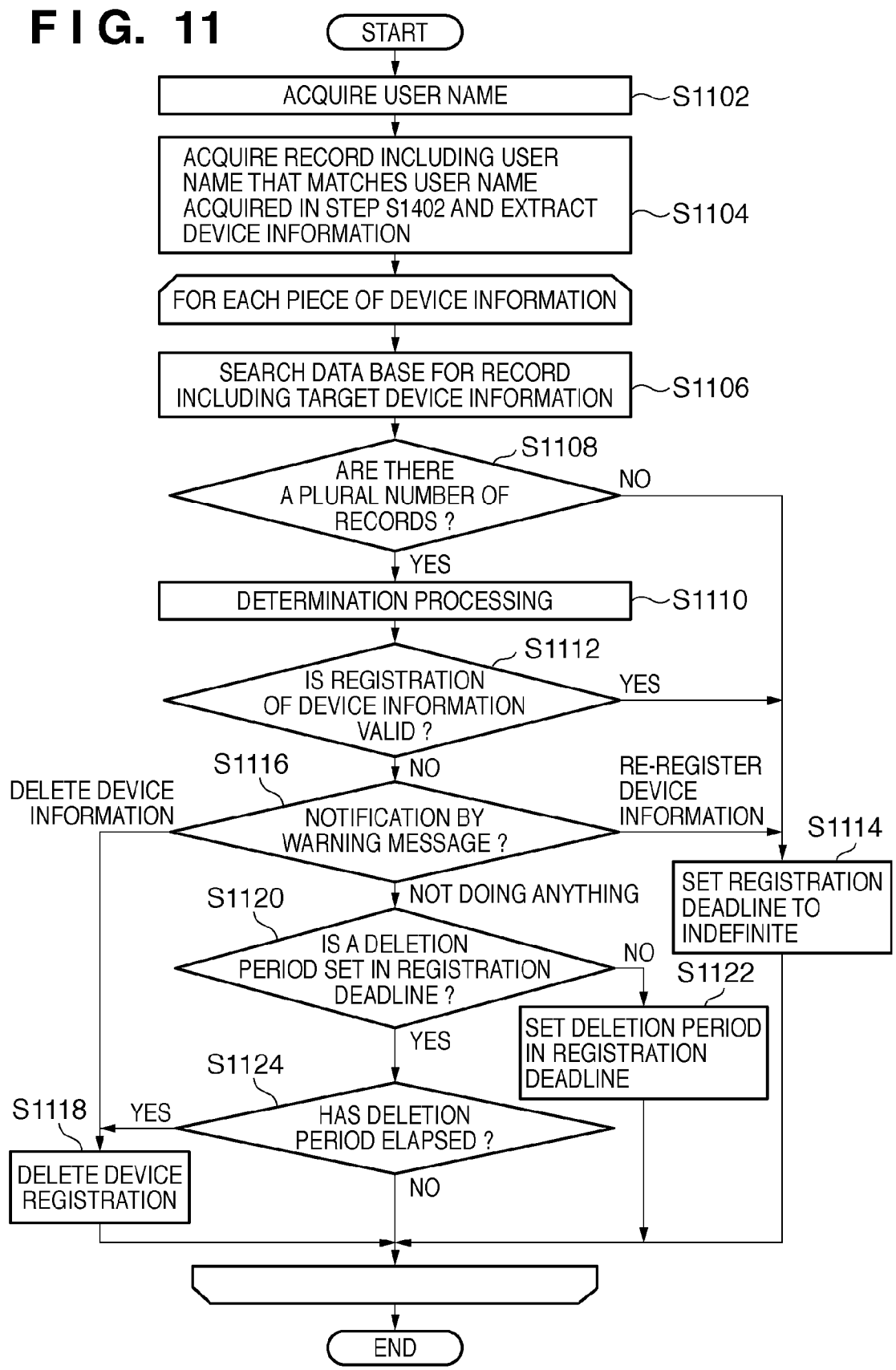
FIG. 11 is a flow chart illustrating the processing executed in the server apparatus when the user makes a connection to the online service via the client apparatus in the system shown in FIG. 1.

With reference to FIG. 11, descriptions are given of the processing executed by the server apparatus 20 before providing the main page 400 with the successful log-in authentication of the client apparatus 10 in the system 1.

The processing of steps S1102 to S1110 are the same as the processing of steps S702 to S710 shown in FIG. 7.

In step S1112, it is determined whether or not the registration of device information by the logged in user is valid based on the result of the determination processing in step S710.

When the registration of device information by the logged in user is valid, in step S1114, the registration deadline 1017 of the record 1010 is set to indefinite and, setting the next piece of device information as the target, the processing from step S1106 is repeated.

When the registration of device information by the logged in user is not valid (when it is invalid), in step S1116, the client apparatus 10 is notified with a warning message (FIG. 12) indicating that the registration of the device information is invalid.

Figure 12:
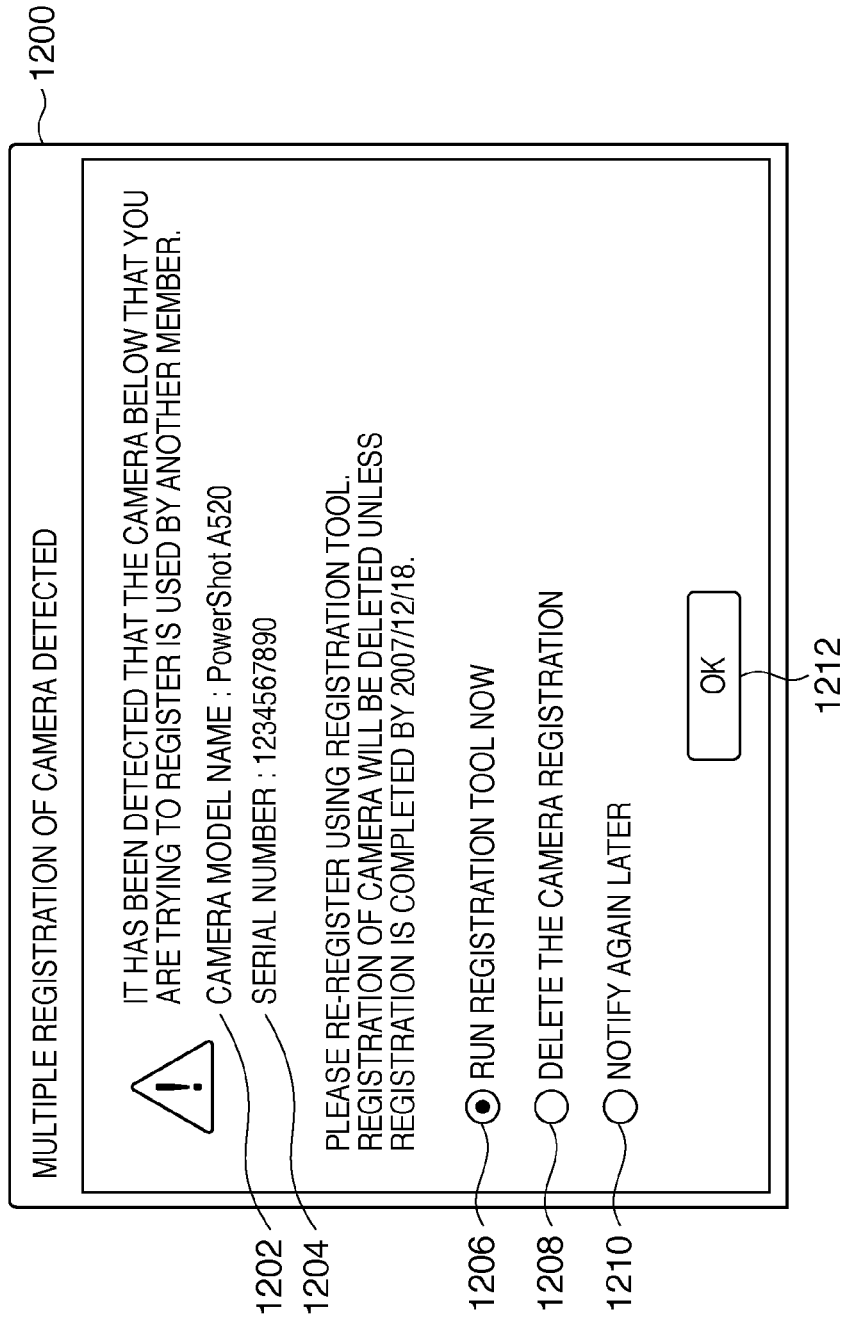
FIG. 12 is a diagram illustrating a warning message the client apparatus is notified with in step S1116 shown in FIG. 11.

FIG. 12 is a diagram illustrating a warning message 1200 the client apparatus 10 is notified with in step S1116. The warning message 1200 is displayed on the display unit 120 of the client apparatus 10. The warning message 1200 displays a camera model name 1202 and a serial number 1204 for the user to see which piece of device information registration is determined to be invalid. The warning message 1200 also includes radio buttons 1206 to 1210 for selecting re-registration of the device information by connecting the camera 30 to the client apparatus 10, deletion of the registered device information, or not doing anything.

When a user selects the radio button 1206, connects the camera 30 to the client apparatus 10, and clicks the OK button 1212, the camera model name and the serial number recorded in the main body of the camera 30 are sent to the client apparatus 10, and automatically inputted thereto. Then, the camera model name and the serial number inputted into the client apparatus 10 are sent to the server apparatus 20 and re-registered (updated). That is, the acquisition scheme 1016 of the device information is changed from MANUAL to AUTO, and the registration time 1015 is also updated.

When the user selects the radio button 1208 and clicks the OK button 1212, deletion of the device information is instructed from the client apparatus 10, and the record of the device information associated with the logged in user is deleted.

When the radio button 1210 is selected and the OK button 1212 is clicked, the warning message 1200 is closed without anything being done.

Referring back to FIG. 11, when the radio button 1206 (that is, re-registration of device information) of the warning message 1200 shown in FIG. 12 is selected, in step S1114, updating is carried out with the new device information, and the registration deadline 1017 of the record 1010 is set to indefinite. In other words, the deletion period set in the registration deadline 1017 of the record 1010 is canceled. Then, setting the next piece of device information as the target, the processing from step S1106 is repeated.

When the radio button 1208 (that is, deletion of device information) of the warning message 1200 shown in FIG. 12 is selected, in step S1118, the record storing the device information of the logged in user is deleted. Then, setting the next piece of device information as the target, the processing from step S1106 is repeated. When the deletion of the device information is selected, even though the deletion period set in the registration deadline 1017 of the record 1010 has not elapsed, the record is deleted.

When the radio button 1210 (that is, do nothing) of the warning message 1200 shown in FIG. 12 is selected, in step S1120, a determination is made as to whether the deletion period is set to the registration deadline 1017 of the record 1010.

When no deletion period is set in the registration deadline 1017 of the record 1010, in step S1122, a predetermined deletion period (for example, 6 months) is set in the registration deadline 1017 of the record 1010. Then, setting the next piece of device information as the target, the processing from step S1106 is repeated.

When the deletion period has been set in the registration deadline 1017 of the record 1010, in step S1124, a determination is made as to whether the deletion deadline set in the registration deadline 1017 of the record 1010 has elapsed.

When the deletion deadline set in the registration deadline 1017 of the record 1010 has elapsed, in step S1118, the record storing the device information of the logged in user is deleted. Then, setting the next piece of device information as the target, the processing from step S1106 is repeated.

When the deletion deadline set in the registration deadline 1017 of the record 1010 has not elapsed, setting the next piece of device information as the target, the processing from step S1106 is repeated.

According to the second embodiment, when the registration of the device information is determined to be invalid, a warning message (FIG. 12) can be displayed and the device information can be deleted automatically if re-registration of the device information is not performed within the deletion period (a predetermined period). Thus, by deleting the registration of the device information determined to be invalid, the multiple registrations of the device information can be removed. Furthermore, service provision to a peripheral device with invalidly registered device information can be prevented. For example, it is not necessary that advertisements compatible with the peripheral device with invalidly registered device information be displayed in the advertisement display region 406 in the main page 400 shown in FIG. 4 and, therefore, the operation costs of the system 1 can be effectively suppressed, and user confusion regarding the displayed information can be prevented as well.

Note that when registration of all of the device information is considered valid when the acquisition scheme of all of the multiple-registered device information is MANUAL as in the determination processing shown in FIG. 9, invalidly registered device information cannot be deleted completely. Therefore, when the purpose is to suppress the operation costs of the system 1, all registrations of the device information are determined to be invalid when the acquisition scheme of the multiple-registered device information is MANUAL as shown in FIG. 13.

Figure 13:
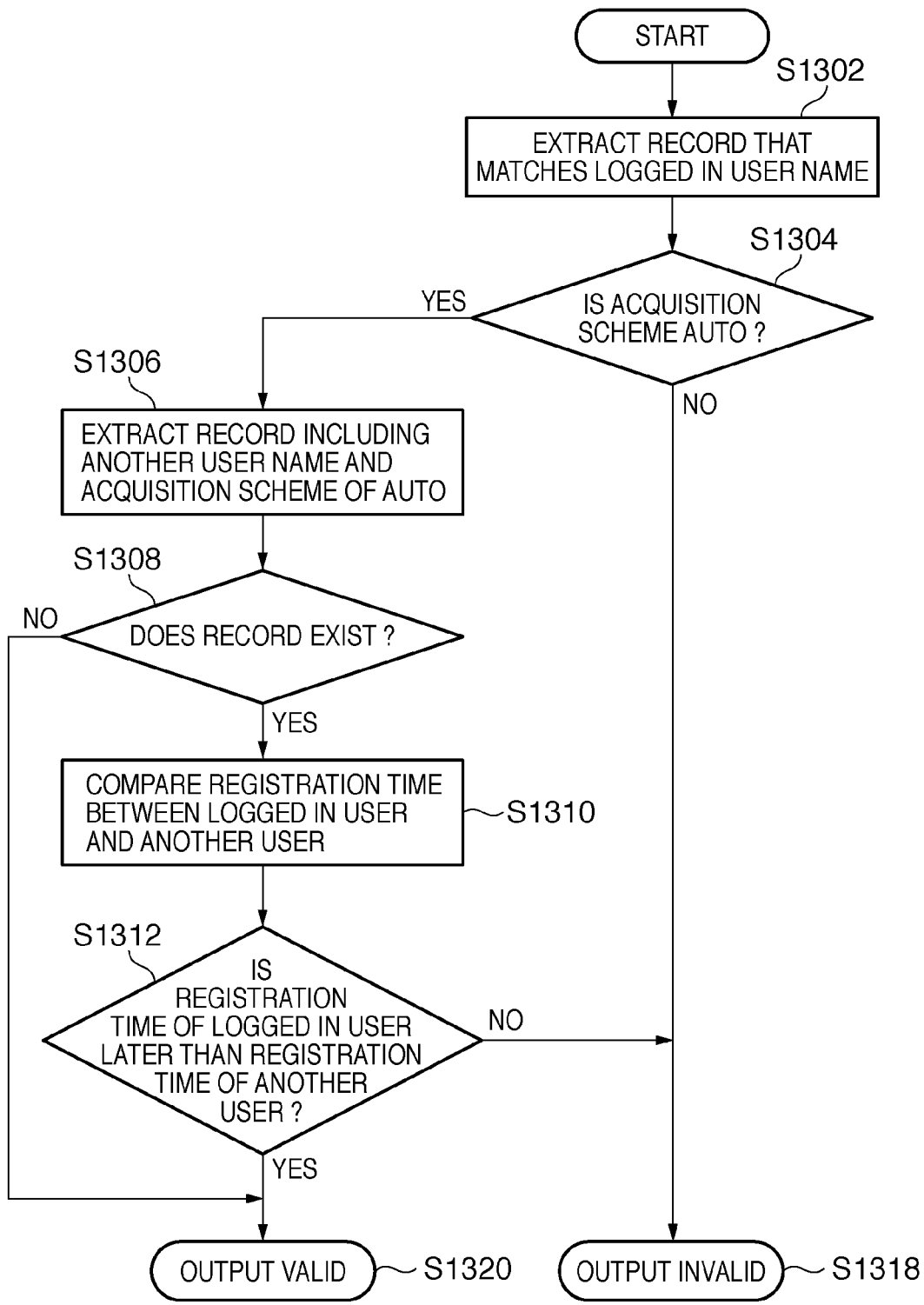
FIG. 13 is a flow chart illustrating the determination processing in step S1110 shown in FIG. 11.

FIG. 13 is a flow chart illustrating the determination processing in step S1110. The processing of steps S1302 to S1312, and S1318 and S1320 is the same as the processing of steps S902 to S912, S918 and S920 shown in FIG. 9. The difference between the determination processing shown in FIG. 13 and the determination processing shown in FIG. 9 is the processing when the acquisition scheme of the record of the logged in user name extracted in step S1302 is AUTO. In the determination processing shown in FIG. 13, when the acquisition scheme of the record of the logged in user name is not AUTO, regardless of the acquisition scheme of the record of another user, in step S1318, the fact that the registration of the device information by the logged in user is invalid is outputted.

Third Embodiment

In the first embodiment and the second embodiment, descriptions are given of processing in which it is determined whether the registration of the device information is valid or invalid with regard to multiple-registered device information. In the third embodiment, descriptions are given of processing in which the registration of device information that would be a multiple registration is prevented at the time of the registration of such device information.

Figure 14:
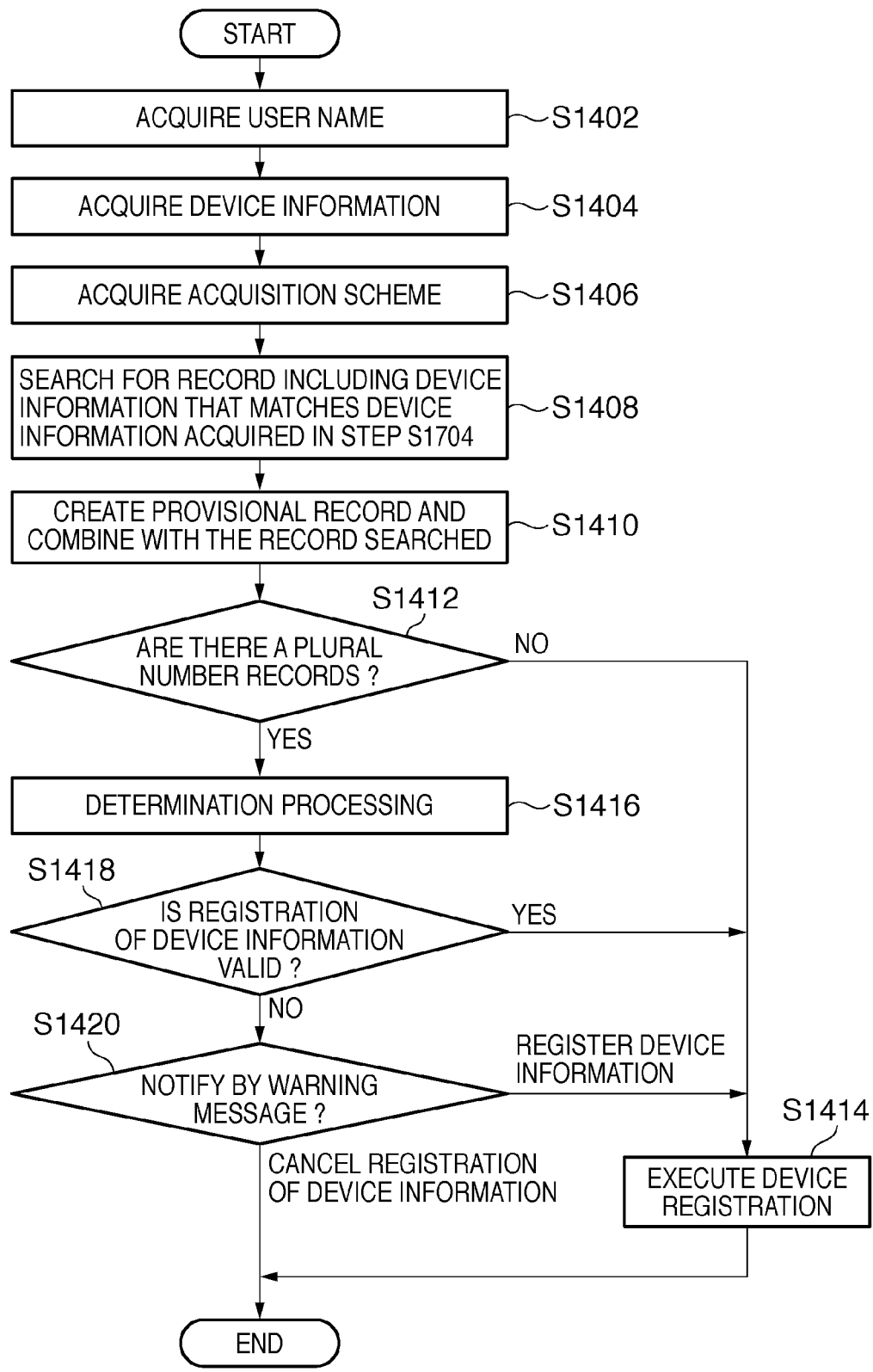
FIG. 14 is a flow chart illustrating the processing executed in the server apparatus when the user registers the device information of the peripheral device via the client apparatus in the system shown in FIG. 1.

With reference to FIG. 14, descriptions are given of the processing executed in the server apparatus 20 when the user registers the device information of the peripheral device via the client apparatus 10 in the system 1. When the send button 530 of the registration page 500 shown in FIG. 5 is clicked, the server apparatus 20 executes the processing shown in FIG. 14.

First, in step S1402, the user name of the logged in user is acquired in the same manner as step S702. Next, in step S1404, the new device information of the registration attempt is acquired from the client apparatus 10. Next, in step S1406, the acquisition scheme of the new device information of the registration attempt is acquired. Note that steps S1402 to S1406 are executed by receiving information sent from the client apparatus 10 at the server apparatus 20, clicking the send button 530 of the registration page 500 shown in FIG. 5.

Next, in step S1408, the database 600 is searched for the record 610 including device information that matches the device information acquired in step S1404.

Then, in step S1410, a provisional record is created based on the user name, the device information, and the acquisition scheme acquired in steps S1402 to S1406, and the record is stored in a temporary storage region. Note that when the provisional record is created, the registration time is set to the current time.

Next, in step S1412, it is determined whether or not the record 610 searched for in step S1408 exists.

When no record is found in step S1408, in step S1414, regular registration processing of the device information of the provisional record is executed, the record is stored in the database 600, and the processing ends.

When a record is found in step S1408, because there are a plural number of records, in step S1416, determination processing in which it is determined whether the device information acquired in step S1404 is valid or invalid is executed. The determination processing in step S1416 is the same as the determination processing shown in FIG. 9, and therefore detailed descriptions are omitted here.

In step S1418, it is determined whether the registration of the new device information of the registration attempt is valid based on the result of the determination processing in step S1416.

When the registration of the new device information of the registration attempt is valid, in step S1414, regular registration processing of the device information of the provisional record is executed, the record is stored in the database 600, and the processing ends.

When the registration of the new device information of the registration attempt is not valid (when it is invalid), in step S1420, the client apparatus 10 is notified with a warning message (FIG. 15) indicating that the registration of the new device information of the registration attempt is invalid.

Figure 15:
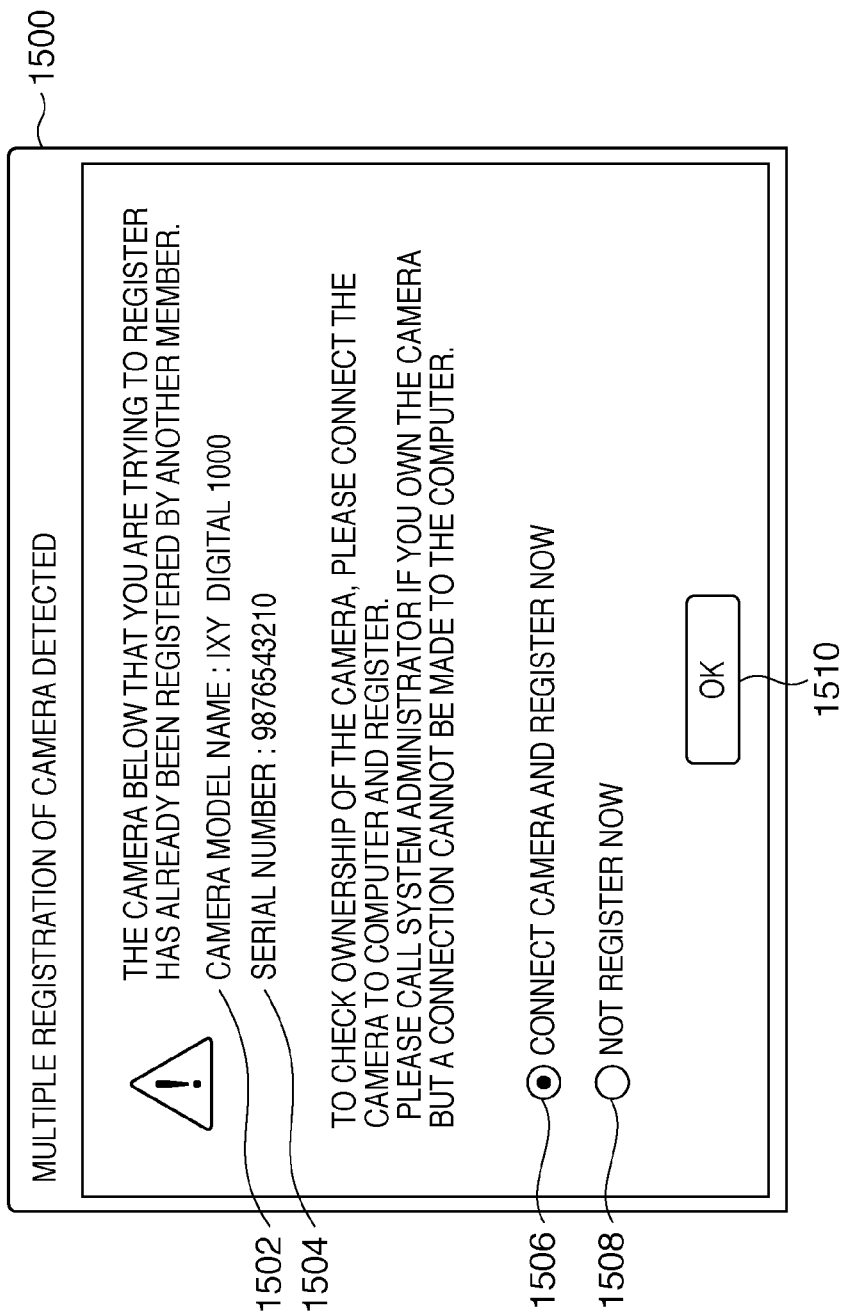
FIG. 15 is a diagram illustrating a warning message the client apparatus is notified with in step S1120 shown in FIG. 14.

FIG. 15 is a diagram illustrating a warning message 1500 the client apparatus 10 is notified with in step S1420. The warning message 1500 is displayed on the display unit 120 of the client apparatus 10. The warning message 1500 displays a camera model name 1502 and a serial number 1504 for the user to see that the registration of the device information of that attempt was determined to be invalid. The warning message 1500 also includes radio buttons 1506 and 1508 for selecting if the device information is acquired from the peripheral device that is connected to the client apparatus 10 and registered, or the registration is cancelled.

When the radio button 1506 is selected and the peripheral device is connected to the client apparatus 10, and the OK button 1510 is clicked, the device information is automatically input from the peripheral device to the client apparatus 10. Then, the device information input into the client apparatus 10 is sent to the server apparatus 20 and registered.

When the radio button 1508 is selected and the OK button 1510 is clicked, the registration of the device information is canceled and the warning message 1500 is closed.

Referring back to FIG. 14, when the radio button 1506 (that is, registration of the device information) of the warning message 1500 shown in FIG. 15 is selected, the device information is acquired from the peripheral device connected to the client apparatus 10, and in step S1414, the device information is sent to the server apparatus 20. The server apparatus 20 creates a record of the device information that has been sent, and stores the record in a database 2600.

When the radio button 1508 (that is, canceling the registration of the device information) of the warning message 1500 shown in FIG. 15 is selected, the registration of the device information is cancelled, and the processing ends.

According to this embodiment, multiple registration can be prevented by making a determination whether the registration of the new device information of the registration attempt is valid or invalid when trying to newly register device information with regard to previously registered device information, and registering only that device information determined as valid.

Fourth Embodiment

When multiple registration of device information occurs, because the number of pieces of device information registered becomes larger than the number of peripheral devices actually owned by the user, the accuracy of statistical information when operating the system 1 declines. In this case, a count unit that counts 1 for multiple-registered device information may be provided in the server apparatus 20. Or, a count unit that counts, for multiple-registered device information, all the multiple-registered device information with the acquisition scheme of MANUAL as 0 and the rest as 1 may be provided in the server apparatus 20. In this way, even if multiple registration of device information occurs, the decline in accuracy in statistical information when operating the system 1 can be prevented.

The objects of the present invention can also be achieved by supplying a storage medium storing a program code of software that realizes the functions of the foregoing embodiments in a system or a device. Therefore, it goes without saying that this may also be achieved through a computer of a system or apparatus (or CPU, MPU, etc.) reading and executing the program code stored in the storage medium.

In this case, the program code read from the storage medium itself realizes the functions of the embodiments described above, and the storage medium in which the program code is stored constitutes the present invention. As a storage medium for providing (recording) the program code, for example, flexible disks, hard disks, optical disks, CD-ROMs, CD-Rs, magnetic tape, non-volatile semiconductor memory cards, ROMs, and the like may be used.

Furthermore, the functionality of the above embodiments is also realized by executing a program code read by a computer. However, it goes without saying that cases are also included in which an OS (operating system), etc., running on the computer performs all or part of the actual processes based on the instructions of the program code, and the functionality of the embodiments described above thereby being realized by these processes.

Furthermore, the program code read from the storage medium is written into a memory provided to a function enhancing board inserted into the computer or a function enhancing unit connected to the computer. It goes without saying that a case is also included in which a CPU, etc., provided to the function enhancing board or the function enhancing unit performs all or part of the actual processes based on the instructions of the program code and the functionality of the embodiments described above is thereby realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application Nos. 2008-148318 filed on Jun. 5, 2008 and 2009-118046 filed on May 14, 2009, which are hereby incorporated by reference herein in their entirety.

What is claimed is:

1. A server apparatus, that can communicate with a plurality of client apparatuses via a network, comprising:
instructions stored in a memory and a processor executing instructions, wherein the processor configures:
a receiving unit to receive user information for specifying a user of a client apparatus, device information relating to a peripheral device connected to the client apparatus and acquisition scheme information representing an acquisition scheme of the device information from the client apparatus, whereby the client apparatus acquires the device information using a first acquisition scheme which acquires the device information via values manually inputted by the user or using a second acquisition scheme whereby the device information is to be automatically inputted from the peripheral device connected to the client apparatus;
a storing unit to store the received device information and the acquisition scheme information in association with the user information; and
a replacing unit to replace second user information stored in association with second device information already stored in the storing unit with first user information received in association with first device information, if the first device information matches the second device information,
wherein said replacing unit does not replace the second user information with the first user information, if first acquisition information received in association with the first device information represents the first acquisition scheme and second acquisition information stored in association with the second device information represents the second acquisition scheme, even if the first device information matches the second device information.

2. The server apparatus according to claim 1, wherein
the device information includes a serial number and a model name, and
the storing unit does not store a model name included in the first device information in a case where a serial number included in the first device information matches a serial number included in the second device information and the first acquisition information represents the first acquisition scheme, and stores a model name included in the first device information by overwriting a model name included in the second device information with the model name included in the first device information in a case where the serial number included in the first device information matches the serial number included in the second device information and the first acquisition information represents the second acquisition scheme.

3. The server apparatus according to claim 1, wherein
the storing unit stops storing the first device information in a case where the first device information matches the second device information and the first acquisition information represents the first acquisition scheme.

4. The server apparatus according to claim 1, further comprising:
a notification unit configured to notify the client apparatus of an error message representing that the first device information is invalid if the first device information matches the second device information, in a case where the first acquisition information represents the first acquisition scheme, and not notify the client apparatus of the error message in a case where the first acquisition information represents the second acquisition scheme.

5. The server apparatus according to claim 4, wherein
the receiving unit receives user information of a client apparatus that a log-in authentication has succeeded, and
the notification unit notifies the client apparatus of the error message each time the client apparatus logs into the server apparatus.

6. A method for controlling a server apparatus that can communicate with a plurality of client apparatuses via a network, the method comprising the steps of:
receiving user information for specifying a user of a client apparatus, device information relating to a peripheral device connected to the client apparatus and acquisition scheme information representing an acquisition scheme of the device information from the client apparatus, whereby the client apparatus acquires the device information using a first acquisition scheme which acquires the device information via values manually inputted by the user or using a second acquisition scheme whereby the device information is to be automatically inputted from the peripheral device connected to the client apparatus;
storing the received device information and the acquisition scheme information in association with the user information;
replacing second user information stored in association with second device information already stored in the storing step with first user information received in association with first device information, if the first device information matches the second device information,
wherein the replacing step does not replace the second user information with the first user information, if first acquisition information received in association with the first device information represents the first acquisition scheme and second acquisition information stored in association with the second device information represents the second acquisition scheme, even if the first device information matches the second device information.

7. A non-transitory computer storage medium storing a computer readable program causing a computer actualizing a server apparatus that can communicate with a plurality of clients apparatuses via a network to execute the steps of:
receiving user information for specifying a user of a client apparatus, device information relating to a peripheral device connected to the client apparatus and acquisition scheme information representing an acquisition scheme of the device information from the client apparatus, whereby the client apparatus acquires the device information using a first acquisition scheme which acquires the device information via values manually inputted by the user or using a second acquisition scheme whereby the device information is to be automatically inputted from the peripheral device connected to the client apparatus;

storing the received device information and the acquisition scheme information in association with the user information;

replacing second user information stored in association with second device information already stored in the storing step with first user information received in association with first device information, if the first device information matches the second device information, wherein the replacing step does not replace the second user information with the first user information, if first acquisition information received in association with the first device information represents the first acquisition scheme and second acquisition information stored in association with the second device information represents the second acquisition scheme, even if the first device information matches the second device information.

* * * * *